(12) United States Patent
Kim

(10) Patent No.: US 8,422,996 B2
(45) Date of Patent: Apr. 16, 2013

(54) METHOD AND APPARATUS FOR PROVIDING ADVERTISEMENT IN MOBILE TERMINAL, AND SYSTEM THEREFOR

(75) Inventor: Kyu-Won Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1242 days.

(21) Appl. No.: 12/017,753

(22) Filed: Jan. 22, 2008

(65) Prior Publication Data

US 2008/0176534 A1 Jul. 24, 2008

(30) Foreign Application Priority Data

Jan. 22, 2007 (KR) ........................ 10-2007-0006590

(51) Int. Cl.
*H04M 1/725* (2006.01)
(52) U.S. Cl.
USPC ..................... 455/412.2; 455/412.1; 455/566; 455/414.1; 455/567
(58) Field of Classification Search ............... 455/412.1, 455/412.2, 456.3, 466, 567, 414.1; 705/14.1, 705/14.4, 14.58, 14.64, 14.67, 14.68, 14.72
See application file for complete search history.

(56) References Cited

U.S. PATENT DOCUMENTS

| | | | |
|---|---|---|---|
| 6,665,531 B1 * | 12/2003 | Soderbacka et al. | 455/412.1 |
| 7,818,031 B2 * | 10/2010 | Laumen et al. | 455/558 |
| 2002/0085027 A1 | 7/2002 | Kim | |
| 2003/0096625 A1 * | 5/2003 | Lee et al. | 455/466 |
| 2006/0217135 A1 * | 9/2006 | Moore et al. | 455/466 |
| 2007/0275696 A1 * | 11/2007 | Cheng et al. | 455/412.1 |

FOREIGN PATENT DOCUMENTS

| | | |
|---|---|---|
| KR | 1020010106817 | 12/2001 |
| KR | 1020010113606 | 12/2001 |
| KR | 1020020023512 | 3/2002 |
| KR | 1020020056985 | 7/2002 |
| KR | 1020040057429 | 7/2004 |
| WO | WO 2005107290 A1 * | 11/2005 |

* cited by examiner

*Primary Examiner* — Marcos Torres
(74) *Attorney, Agent, or Firm* — The Farrell Law Firm, P.C.

(57) ABSTRACT

Provided is a system for providing a silent advertisement that includes a multimedia message server for generating a multimedia message containing at least one piece of silent advertisement data and transmitting the multimedia message to an arbitrary mobile terminal, and the mobile terminal for receiving the multimedia message, detecting and storing the silent advertisement data contained in the multimedia message without notifying a user, and if a current operational state of the mobile terminal corresponds to a pre-set silent advertisement output condition, outputting the silent advertisement data. Accordingly, provided is a method, apparatus, and system for silently transmitting advertisement data to a mobile terminal of a user even if the user does not request to receive advertisements in advance, which are used by a communication provider to modify advertisement data stored in advance in the mobile terminal of the user in response to a request of a sponsor.

14 Claims, 7 Drawing Sheets

METHOD AND APPARATUS FOR PROVIDING ADVERTISEMENT IN MOBILE TERMINAL, AND SYSTEM THEREFOR

PRIORITY

This application claims priority under 35 U.S.C. §119(a) to a Patent Application filed in the Korean Intellectual Property Office on Jan. 22, 2007 and assigned Serial No. 2007-6590, the contents of which are incorporated herein by reference.

BACKGROUND OF THE INVENTION

1. Field of the Invention

The present invention relates generally to a mobile terminal, and in particular, to a method, apparatus, and system for providing an advertisement in a mobile terminal.

2. Description of the Related Art

In general, an advertisement service using mobile terminals is to provide an advertisement in a mobile terminal of each user using a Short Message Service (SMS) server or a Multimedia Messaging Service (MMS) server in a case where the user requests to receive advertisements in advance.

However, since the advertisement service cannot transmit any advertisement to the mobile terminal if the user does not request to receive advertisements in advance, no advertisement can be provided to the mobile terminal in that case. In addition, the advertisement service cannot allow a communication provider sending advertisements to modify an advertisement stored in mobile terminals of users in response to a request of a sponsor.

SUMMARY OF THE INVENTION

An aspect of the present invention is to substantially solve at least the above problems and/or disadvantages and to provide at least the advantages below. Accordingly, an aspect of the present invention is to provide a method, apparatus, and system for silently transmitting advertisement data to a mobile terminal of a user even if the user does not request to receive advertisements in advance.

Another aspect of the present invention is to provide a method, apparatus, and system used by a communication provider to modify advertisement data stored in advance in a mobile terminal of a user in response to a request of a sponsor.

According to one aspect of the present invention, there is provided a system for providing a silent advertisement, the system including a multimedia message server for generating a multimedia message containing at least one piece of silent advertisement data and transmitting the multimedia message to an arbitrary mobile terminal; and the mobile terminal for receiving the multimedia message, detecting and storing the silent advertisement data contained in the multimedia message without notifying a user of the reception, and if a current operational state of the mobile terminal corresponds to a pre-set silent advertisement output condition, outputting the silent advertisement data.

According to another aspect of the present invention, there is provided a system for providing a silent advertisement, the system including a multimedia message server for generating an advertisement notification signal used to add, delete, or modify silent advertisement data and transmitting the advertisement notification signal to an arbitrary mobile terminal, and transmitting a multimedia message containing at least one piece of silent advertisement data to the mobile terminal in response to a request of the mobile terminal; and the mobile terminal for receiving the advertisement notification signal for addition, transmitting a transmission signal for requesting to transmit a multimedia message to the multimedia message server, receiving the multimedia message, detecting and storing the silent advertisement data contained in the multimedia message without notifying a user of the reception, and if a current operational state of the mobile terminal corresponds to a pre-set silent advertisement output condition, outputting the silent advertisement data.

According to another aspect of the present invention, there is provided a method of providing a silent advertisement, the method including a multimedia message server generating a multimedia message containing at least one piece of silent advertisement data and transmitting the multimedia message to an arbitrary mobile terminal; if the multimedia message is received, the mobile terminal detecting and storing the silent advertisement data contained in the multimedia message without notifying a user of the reception; and if a current operational state of the mobile terminal corresponds to a pre-set silent advertisement output condition, the mobile terminal outputting the silent advertisement data.

According to another aspect of the present invention, there is provided a method of providing a silent advertisement, the method including a multimedia message server generating an advertisement notification signal used to add, delete, or modify silent advertisement data and transmitting the advertisement notification signal to an arbitrary mobile terminal; if the advertisement notification signal for addition is received, the mobile terminal transmitting a transmission signal for requesting to transmit a multimedia message to the multimedia message server; if the transmission signal is received, the multimedia message server transmitting a multimedia message containing at least one piece of silent advertisement data to the mobile terminal; if the multimedia message is received, the mobile terminal detecting and storing the silent advertisement data contained in the multimedia message without notifying a user of the reception; and if a current operational state of the mobile terminal corresponds to a pre-set silent advertisement output condition, the mobile terminal outputting the silent advertisement data.

According to another aspect of the present invention, there is provided a method of providing a silent advertisement in a mobile terminal, the method including if an advertisement notification signal for addition is received from among advertisement notification signals used to add, delete, and modify silent advertisement data, transmitting a transmission signal for requesting a transmission of a multimedia message containing at least one piece of silent advertisement data; if the multimedia message is received, detecting and storing the silent advertisement data contained in the multimedia message without notifying a user of the reception; and if a current operational state of the mobile terminal corresponds to a pre-set silent advertisement output condition, outputting the silent advertisement data.

According to another aspect of the present invention, there is provided an apparatus for providing a silent advertisement in a mobile terminal, the apparatus including a display unit; a sound processing unit; a Radio Frequency (RF) module; and a controller for, if an advertisement notification signal for addition is received from among advertisement notification signals used to add, delete, and modify silent advertisement data, transmitting a transmission signal for requesting to transmit a multimedia message containing at least one piece of silent advertisement data, if the multimedia message is received in response to the transmission signal, detecting and storing the silent advertisement data contained in the multimedia message without notifying a user of the reception, and if a current operational state of the mobile terminal corresponds to a pre-set silent advertisement output condition outputting the silent advertisement data.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figure 1:
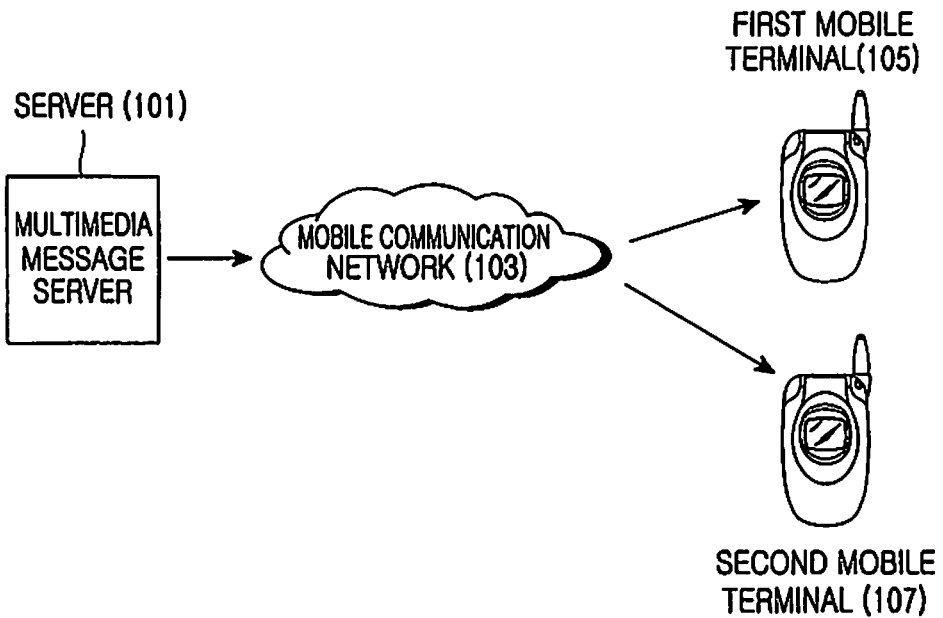
FIG. 1 is a configuration of an advertisement providing system according to an exemplary embodiment of the present invention.

FIG. 1 is a configuration of an advertisement providing system according to an exemplary embodiment of the present invention. Components of the advertisement providing system will now be described with reference to FIG. 1.

The advertisement providing system includes a multimedia message server 101, a mobile communication network 103, a first mobile terminal 105, and a second mobile terminal 107.

The multimedia message server 101 provides a Multimedia Messaging Service (MMS) and allows mobile terminals to exchange multimedia messages with each other. In particular, in the current embodiment, the multimedia message server 101 transmits a multimedia message containing advertisement data requested by a sponsor to at least one mobile terminal via the mobile communication network 103.

The MMS is a service for transmitting various formats of data, such as a still image, music, voice, and a moving picture, to an arbitrary mobile terminal. The MMS has a message transmission and reception function provided by existing systems, such as a Voice Messaging System (VMS) and a Unified Messaging System (UMS), and supports transmission and reception of bulk data, such as a moving picture. A service subscriber can view or send an email, a fax, a voice message, and various types of messages containing a multimedia element, such as a video news clip or a video mail message, at any time or place without a distinction among types of mobile terminals.

The advertisement data can be configured in various formats according to content provided by the sponsor and include a still image, music, voice, and text. The advertisement data may include an identification number for identifying arbitrary advertisement data. For example, the arbitrary advertisement data can include a still image such as a banner, a moving picture, music, advertisement text such as an advertisement copy, and arrangement text indicating an arrangement order of advertisement data. If the advertisement text is created in the format of a Synchronized Multimedia Integration Language (SMIL), a HyperText Markup Language (HTML), or an eXtensible Markup Language (XML), the mobile terminal 105 or 107 can display the advertisement text so that the advertisement text moves when the advertisement text is output.

More specifically, the multimedia message server 101 can transmit an advertisement notification signal relating to process, i.e. add, modify, or delete, an advertisement to the mobile terminals 105 and 107. If an advertisement transmission request signal is received from the mobile terminals 105 and 107, the multimedia message server 101 can transmit a pre-defined multimedia message to the mobile terminals 105 and 107. If an advertisement notification response signal is received from the mobile terminals 105 and 107, the multimedia message server 101 can determine that the advertisement notification of the mobile terminals 105 and 107 has been accomplished.

The mobile communication network 103 can transmit a multimedia message or an advertisement notification signal output from the multimedia message server 101 to the mobile terminal 105 or transmit an advertisement notification response signal output from the mobile terminal 105 to the multimedia message server 101.

The mobile terminal 105 receives and stores a multimedia message containing advertisement data from the multimedia message server 101. The mobile terminal can output the advertisement data according to a pre-defined silent advertisement output condition.

The silent advertisement output condition indicates a condition for outputting advertisement data and is preferably defined so that when a user views an advertisement, the user does not have a desire to reject the advertisement. For example, the silent advertisement output condition can be defined so that the advertisement data is output during a transmission time taken when a short message or a multimedia message is transmitted. For another example, the silent advertisement output condition can be defined so that the advertisement data is output during a loading time taken when a program, such as a game, is executed. For another example, the silent advertisement output condition can be defined so that the advertisement data is output together in a popup window for notifying of an operational state of the mobile terminal 105. For another example, the silent advertisement output condition can be defined so that the advertisement data is output together in a popup window for requesting a selection from the user.

The advertisement providing system has been described with reference to FIG. 1. Components of the mobile terminal 105 will now be described with reference to FIG. 2.

Figure 2:
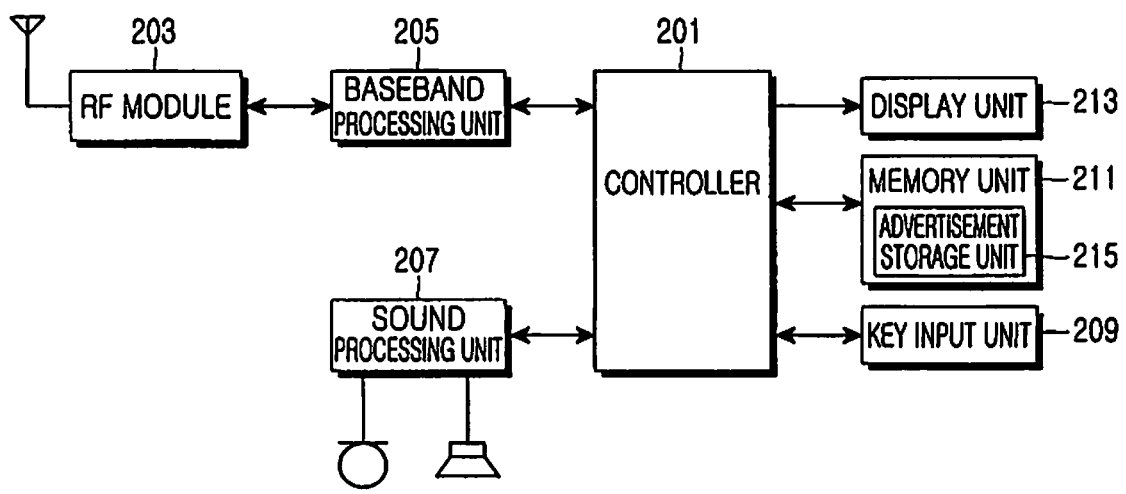
FIG. 2 is block diagram of a mobile terminal according to an exemplary embodiment of the present invention.

Referring to FIG. 2, the mobile terminal 105 includes a controller 201, a baseband processing unit 205, a sound processing unit 207, a key input unit 209, a memory unit 211, and a display unit 213, which are connected to the controller 201, and a Radio Frequency (RF) module 203 connected to the baseband processing unit 205.

The RF module 203 includes an RF transmitter (not shown) for up-converting and amplifying a frequency of a signal to be transmitted and an RF receiver (not shown) for low noise amplifying a received signal and down-converting a frequency of the low noise amplified signal. In particular, in the current embodiment, the RF module 203 receives a multimedia message containing advertisement data from the multimedia message server 101. The baseband processing unit 205 includes a transmitter (not shown) for encoding and modulating a signal to be transmitted and a receiver (not shown) for demodulating and decoding a received signal.

The sound processing unit 207 converts a sound signal input from the controller 201 to an audible sound. In particular, in the current embodiment, the sound processing unit 207 receives a sound signal contained in advertisement data and outputs the sound signal under the control of the controller 201. The key input unit 209 includes numeric keys and special keys (including a '*' key and a '#' key) for a call function of the mobile terminal 105 and function keys for various functions, generates a key signal corresponding to a key pushed by the user, and outputs the key signal to the controller 201.

The display unit 213 displays a current state and an operational state of the mobile terminal 105 under the control of the controller 201, and can be comprised of a Liquid Crystal Display (LCD) or an Organic Light Emitting Diode (OLED) display. In particular, in the current embodiment, the display unit 213 displays a still image, a moving picture, music (lyrics), or text contained in input advertisement data under the control of the controller 201.

The memory unit 211 stores data needed to control the mobile terminal 105. In particular, in the current embodiment, an advertisement storage unit 215 included in the memory unit 211 stores advertisement data contained in a multimedia message.

The controller 201 controls every component of the mobile terminal 105 in order to perform the various functions provided by the mobile terminal 105. In particular, in the current embodiment, the controller 201 receives a multimedia message from the multimedia message server 101 and detects at least one piece of advertisement data by analyzing the multimedia message. The controller 201 stores the detected advertisement data in the advertisement storage unit 215 included in the memory unit 211. If the pre-defined silent advertisement output condition is satisfied, the controller 201 searches for arbitrary advertisement data and outputs the found advertisement data through the sound processing unit 207 and display unit 213.

More specifically, the controller 201 receives an advertisement notification signal from the multimedia message server 101. If the mobile terminal 105 is set to allow advertisement reception, the controller 201 determines, by analyzing the advertisement notification signal, whether the advertisement notification signal is an advertisement modification notification signal, an advertisement addition notification signal, or an advertisement deletion notification signal.

If the advertisement notification signal is the advertisement modification notification signal, the controller 201 deletes advertisement data for which an advertisement modification is requested from among the advertisement data stored in the memory unit 211. Thereafter, the controller 201 generates an advertisement transmission request signal and transmits the advertisement transmission request signal to the multimedia message server 101. The controller 201 receives a multimedia message in response to the advertisement transmission request signal, detects at least one piece of advertisement data by analyzing the multimedia message, and stores the detected advertisement data. The controller 201 generates an advertisement notification response signal indicating that the multimedia message has been successfully received and transmits the advertisement notification response signal to the multimedia message server 101.

If the advertisement notification signal is the advertisement addition notification signal, the controller 201 generates an advertisement transmission request signal and transmits the advertisement transmission request signal to the multimedia message server 101. The controller 201 receives a multimedia message in response to the advertisement transmission request signal, detects at least one piece of advertisement data by analyzing the multimedia message, and stores the detected advertisement data. The controller 201 generates an advertisement notification response signal indicating that the multimedia message has been successfully received and transmits the advertisement notification response signal to the multimedia message server 101.

If the advertisement notification signal is the advertisement deletion notification signal, the controller 201 deletes advertisement data for which an advertisement deletion is requested, generates an advertisement notification response signal indicating that the advertisement data has been successfully deleted, and transmits the advertisement notification response signal to the multimedia message server 101.

If the mobile terminal 105 is set to not allow advertisement reception, the controller 201 generates an advertisement notification response signal indicating that no advertisement can be received and transmits the advertisement notification response signal to the multimedia message server 101.

Thereafter, if the pre-set silent advertisement output condition is satisfied, the controller 201 can search for advertisement data in a pre-defined or an arbitrary order and output the found advertisement data for a predetermined time.

For example, after the mobile terminal 105 transmits a multimedia message or a short message, if the silent advertisement output condition is set to output advertisement data after transmitting a multimedia message or a short message, the controller 201 can search for arbitrary advertisement data from the memory unit 211 and output the found advertisement data. For another example, while the mobile terminal 105 loads an arbitrary program, if the silent advertisement output condition is set to output advertisement data during loading of an arbitrary program, the controller 201 can search for arbitrary advertisement data from the memory unit 211 and output the found advertisement data.

For another example, when a popup window for notifying of an operational state of the mobile terminal 105 is output, if the silent advertisement output condition is set to output advertisement data together in the popup window for notifying of an operational state of the mobile terminal 105, the controller 201 can search for arbitrary advertisement data from the memory unit 211 and output the found advertisement data together in the popup window. For another example, when a popup window for requesting selection of the user is output, if the silent advertisement output condition is set to output advertisement data together in the popup window for requesting selection of the user, the controller 201 can search for arbitrary advertisement data from the memory unit 211 and output the found advertisement data together in the popup window.

Figure 3:
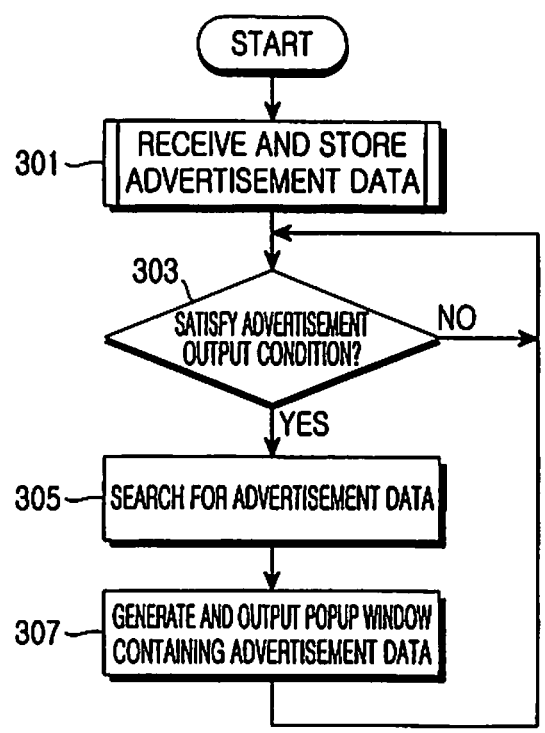
FIG. 3 is a flowchart of a process of providing advertisement data in a mobile terminal according to an exemplary embodiment of the present invention.

FIG. 3 is a flowchart of a process of providing advertisement data in a mobile terminal according to an exemplary embodiment of the present invention. The process of providing advertisement data in a mobile terminal will be described with reference to FIGS. 1 to 3.

In step 301, the controller 201 receives a multimedia message from the multimedia message server 101, detects advertisement data by analyzing the multimedia message, and stores the detected advertisement data.

Figure 4:
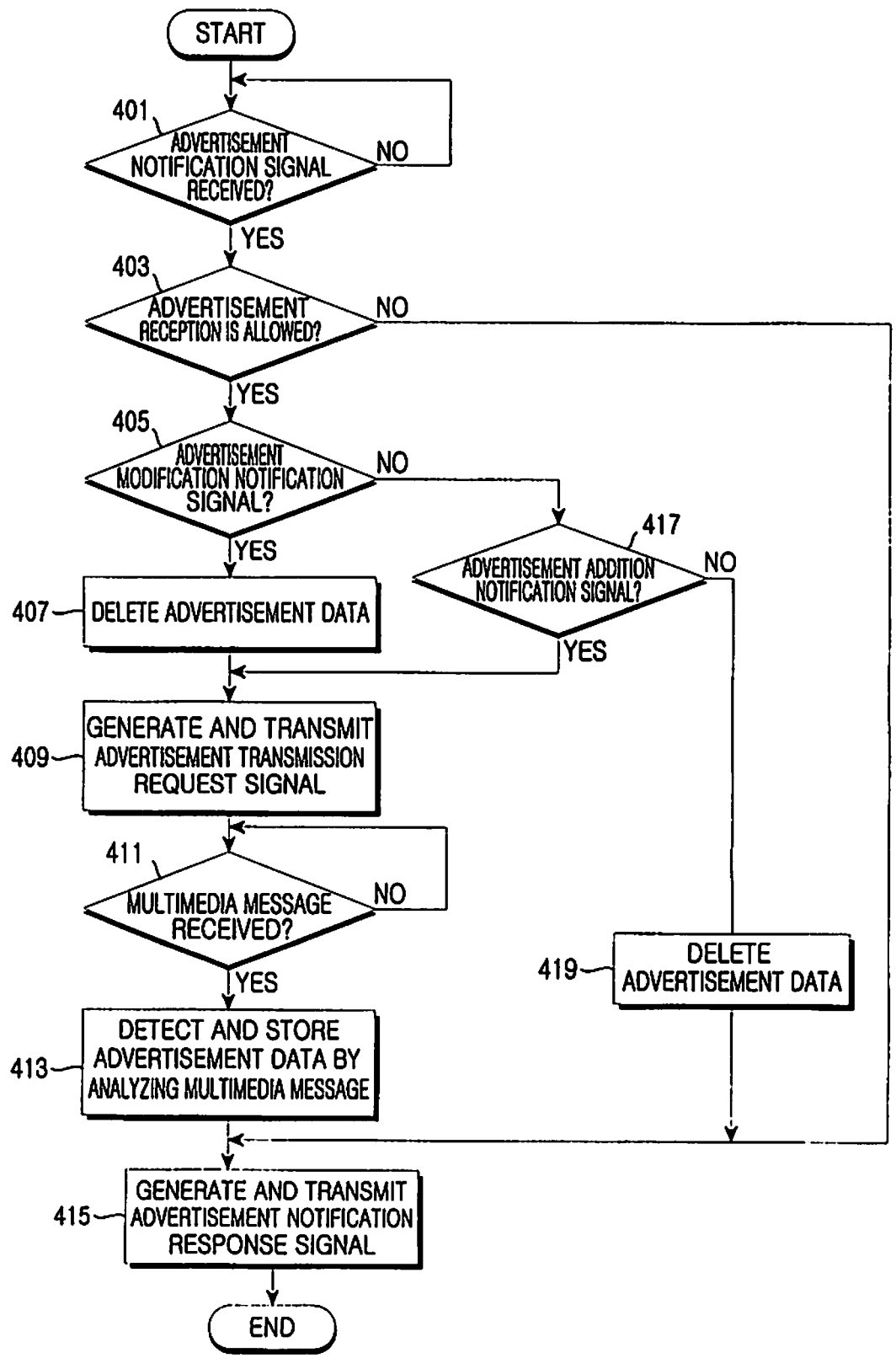
FIG. 4 is a flowchart of a process of receiving advertisement data in a mobile terminal according to an exemplary embodiment of the present invention.

The process of receiving a multimedia message and storing advertisement data contained in the multimedia message will now be described in more detail with reference to FIG. 4.

If the controller 201 receives an advertisement notification signal in step 401, the process goes to step 403. Otherwise, the process repeats step 401.

The controller 201 determines in step 403 whether the mobile terminal 105 is set to allow advertisement reception. If it is determined in step 403 that the mobile terminal 105 is set to allow advertisement reception, the process goes to step 405, and if it is determined in step 403 that the mobile terminal 105 is set not to allow advertisement reception, the process goes to step 415.

The controller 201 determines in step 405 whether the advertisement notification signal received in step 401 is an advertisement modification notification signal. If it is determined in step 405 that the advertisement notification signal is the advertisement modification notification signal, the process goes to step 407, and if it is determined in step 405 that the advertisement notification signal is not the advertisement modification notification signal, the process goes to step 417.

In step 407, the controller 201 searches for an identification number of advertisement data for which an advertisement modification is requested from the advertisement notification signal received in step 401. The controller 201 searches for the advertisement data corresponding to the found identification number from the memory unit 211 and deletes the found advertisement data.

The controller 201 generates an advertisement transmission request signal for requesting advertisement data to be transmitted and transmits the advertisement transmission request signal to the multimedia message server 101 in step 409. The controller 201 determines in step 411 whether a multimedia message containing advertisement data has been received in response to the advertisement transmission request signal. If it is determined in step 411 that a multimedia message has been received, the process goes to step 413, and if it is determined in step 411 that a multimedia message has not been received, the process repeats step 411.

In step 413, the controller 201 detects at least one piece of advertisement data by analyzing the multimedia message received in step 411 and stores the detected advertisement data in the advertisement storage unit 215 included in the memory unit 211, and the process goes to step 415.

If it is determined in step 405 that the advertisement notification signal is not the advertisement modification notification signal, the controller 201 determines in step 417 whether the advertisement notification signal is an advertisement addition notification signal. If it is determined in step 417 that the advertisement notification signal is the advertisement addition notification signal, the process goes to step 409. If it is determined in step 417 that the advertisement notification signal is not the advertisement addition notification signal, the controller 201 determines that the advertisement notification signal is an advertisement deletion notification signal, and the process goes to step 419.

In step 419, the controller 210 searches for an identification number of advertisement data for which an advertisement deletion is requested from the advertisement notification signal received in step 401. The controller 201 searches for the advertisement data corresponding to the found identification number from the memory unit 211 and deletes the found advertisement data, and the process goes to step 415.

In step 415, the controller 210 generates an advertisement notification response signal and transmits the advertisement notification response signal to the multimedia message server 101. In more detail, when the process goes to step 415 after performing step 413, in which the multimedia message is received and the advertisement data is stored, the controller 210 can generate an advertisement notification response signal indicating that the multimedia message has been successfully received and transmit the advertisement notification response signal. When the process goes to step 415 after performing step 419, in which the advertisement data is deleted, the controller 210 can generate an advertisement notification response signal indicating that the multimedia message has been successfully deleted and transmit the advertisement notification response signal. When the process goes to step 415 after performing step 403, in which it is determined that the mobile terminal 105 is set not to allow advertisement reception, the controller 210 can generate an advertisement notification response signal indicating that the advertisement reception is not allowed and transmit the advertisement notification response signal.

Referring back to FIG. 3, the controller 201 determines in step 303 whether a current state of the mobile terminal 105 satisfies the pre-set silent advertisement output condition. If it is determined in step 303 that the current state satisfies the pre-set silent advertisement output condition, which is a condition for outputting a silent advertisement, the process goes to step 305. Otherwise, the process repeats step 303.

In step 305, the controller 201 randomly or sequentially searches for advertisement data from among the at least one piece of advertisement data stored in the memory unit 211.

In step 307, the controller 201 creates a popup window containing the advertisement data found in step 305 and outputs the created popup window. If the found advertisement data contains a sound signal, the controller 201 can output the sound signal together with the popup window. After outputting the advertisement data, the process goes to step 303 in order for the controller 201 to determine whether a current state of the mobile terminal 105 satisfies the silent advertisement output condition.

Figure 5:
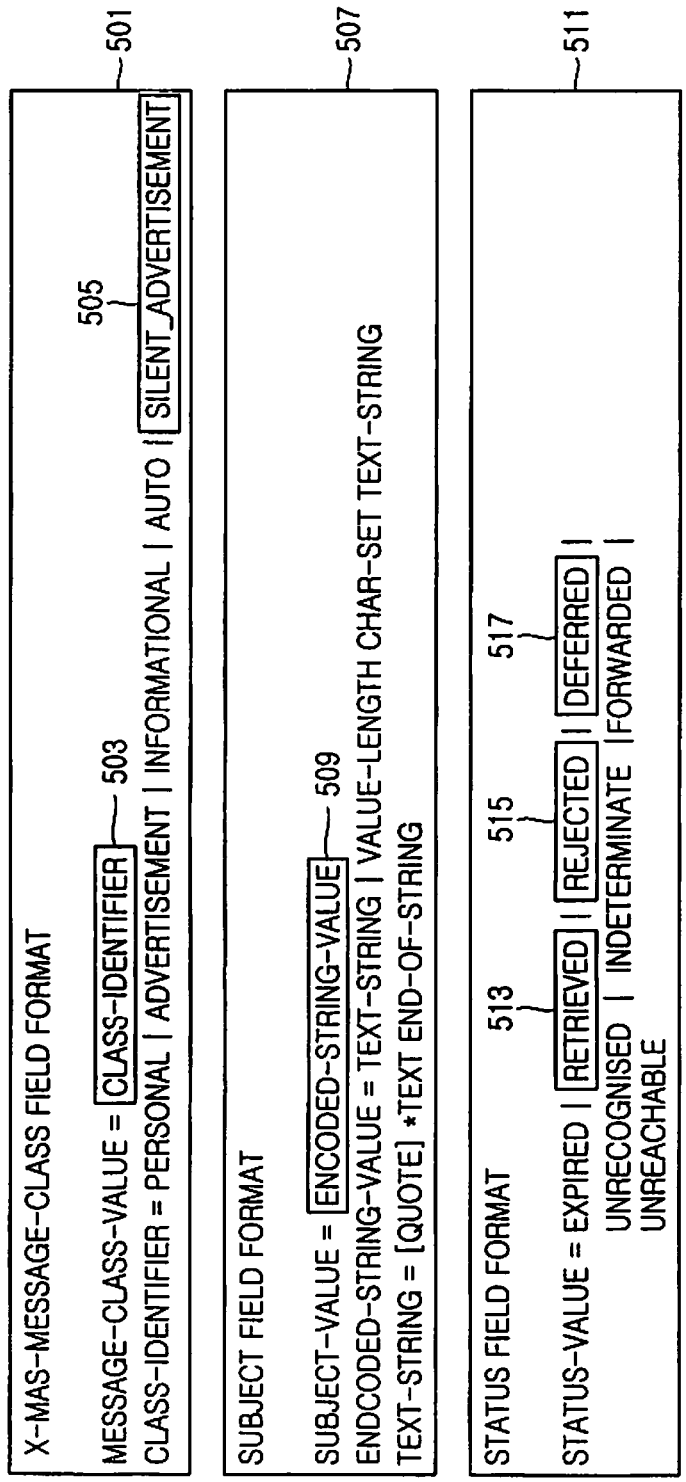
FIG. 5 illustrates fields contained in a Multimedia Messaging Service (MMS) protocol of the Open Mobile Alliance (OMA) according to an exemplary embodiment of the present invention.

The process of providing a silent advertisement in the mobile terminal 105 has been described with reference to FIGS. 3 and 4. A process of providing a silent advertisement in the multimedia message server 101 and the mobile terminal 105, which follow a Multimedia Messaging Service (MMS) protocol of the Open Mobile Alliance (OMA), according to an exemplary embodiment of the present invention will now be described with reference to FIG. 5.

The multimedia message server 101 can generate the advertisement notification signal described above in the form of an M-Notification.ind PDU (Protocol Data Unit) and a multimedia message in the form of an M-Retrieve.conf PDU. The mobile terminal 105 can generate the advertisement transmission request signal in the form of a WSP/HTTP GET.req PDU and the advertisement notification response signal in the form of an M-Notifyresp.ind PDU.

The advertisement notification signal, i.e. the M-Notification.ind PDU, includes a message-class field 501 indicating a message type and a subject field 507 indicating a message purpose.

The message-class field 501 uses 'Message-class-value' to express the message type. The Message-class-value is one kind of 'Token-text' 503 indicating a message type by using 'Class-Identifier' or a text string and can express the message type. In the current embodiment, the Message-class-value is defined as the Token-text 503.

If 'Silent_advertisement' 505 is written in the Message-class-value, M-Notification.ind PDU can indicate that advertisement data is silently transmitted to the mobile terminal 105 without receiving an advertisement request of the user.

If 'ADD' is written in 'Encoded-string-value' 509 of the subject field 507, it can be indicated that M-Notification.ind PDU is a signal for adding advertisement data to the mobile terminal 105. If 'MOD' is written in the Encoded-string-value 509, it can be indicated that M-Notification.ind PDU is a signal for modifying advertisement data stored in the mobile terminal 105. If 'DEL' is written in the Encoded-string-value 509, it can be indicated that M-Notification.ind PDU is a signal for deleting advertisement data stored in the mobile terminal 105.

The multimedia message server 101 can generate an M-Notification.ind signal by writing 'Silent_advertisement' 505 in the Message-class-value of the message-class field 501 contained in M-Notification.ind PDU in order to indicate that the M-Notification.ind signal is a signal associated with a silent advertisement. If the M-Notification.ind signal is a signal for modifying, adding, or deleting advertisement data stored in the mobile terminal 105, the multimedia message server 101 can generate the M-Notification.ind signal by writing 'MOD', 'ADD', or 'DEL' in the Encoded-string-value 509 of the subject field 507. The multimedia message server 101 can transmit the generated M-Notification.ind signal to the mobile terminal 105.

If the M-Notification.ind signal is received, the mobile terminal 105 determines by analyzing the M-Notification.ind signal whether the Class-Identifier 503 of the message-class field 501 is 'Silent_advertisement' 505. If the Class-Identifier 503 is 'Silent_advertisement' 505, the mobile terminal 105 determines whether the mobile terminal 105 is set to allow advertisement reception or not to allow advertisement reception. If the mobile terminal 105 is set to allow advertisement reception, the mobile terminal 105 determines whether the Encoded-string-value 509 of the subject field 507 corresponds to one of 'MOD', 'ADD', and 'DEL'.

If the Encoded-string-value 509 corresponds to 'MOD', the mobile terminal 105 searches for an identification number of advertisement data for which an advertisement modification is requested from the M-Notification.ind signal. The mobile terminal 105 searches for advertisement data corresponding to the found identification number from the memory unit 211 and deletes the found advertisement data. The mobile terminal 105 generates a Web Scraping Proxy/HyperText Transfer Protocol (WSP/HTTP) GET.req signal, which is a signal for requesting transmission of advertisement data. When the mobile terminal 105 generates the WSP/HTTP GET.req signal, the mobile terminal 105 can generate directory information of advertisement data that is to be transmitted from the multimedia message server 101. The directory information of advertisement data can be searched for from the M-Notification.ind signal. The mobile terminal 105 transmits the generated WSP/HTTP GET.req signal to the multimedia message server 101.

If the Encoded-string-value 509 corresponds to 'ADD', the mobile terminal 105 generates a WSP/HTTP GET.req signal, which is a signal for requesting transmission of advertisement data and transmits the generated WSP/HTTP GET.req signal to the multimedia message server 101.

If the Encoded-string-value 509 corresponds to 'DEL', the mobile terminal 105 searches for an identification number of advertisement data for which an advertisement deletion is requested from the M-Notification.ind signal. The mobile terminal 105 searches for advertisement data corresponding to the found identification number from the memory unit 211 and deletes the found advertisement data. The mobile terminal 105 generates an M-Notifyresp.ind signal, which is an advertisement notification response signal. When the mobile terminal 105 generates the M-Notifyresp.ind signal, the mobile terminal 105 can generate the M-Notifyresp.ind signal by inserting 'Retrieved' 513 into a status field 511 included in M-Notification.ind PDU in order to indicate that the advertisement deletion has been successfully performed. The mobile terminal 105 transmits the generated M-Notifyresp.ind signal to the multimedia message server 101.

If the mobile terminal 105 is set not to allow advertisement reception, the mobile terminal 105 can generate an M-Notifyresp.ind signal by inserting 'Rejected' 515 into the status field 511 in order to indicate that advertisement reception is not allowed. The mobile terminal 105 transmits the generated M-Notifyresp.ind signal to the multimedia message server 101.

If a WSP/HTTP GET.req signal is received from the mobile terminal 105, the multimedia message server 101 generates an M-Retrive.conf message containing pre-defined advertisement data. The multimedia message server 101 transmits the generated M-Retrive.conf message to the mobile terminal 105. If directory information of advertisement data of which transmission is requested is contained in the WSP/HTTP GET.req signal, the multimedia message server 101 can search for the advertisement data according to the directory information. The multimedia message server 101 can generate an M-Retrive.conf message containing the found advertisement data and transmit the generated M-Retrive.conf message to the mobile terminal 105.

If an M-Retrive.conf message is received, the mobile terminal 105 detects advertisement data by analyzing the M-Retrive.conf message and stores the detected advertisement data in the memory unit 211 of the mobile terminal 105. The mobile terminal 105 can generate an M-Notifyresp.ind signal by inserting 'Retrieved' 513 into the status field 511 included in M-Notification.ind PDU in order to indicate that the advertisement data has been successfully stored. The mobile terminal 105 transmits the generated M-Notifyresp.ind signal to the multimedia message server 101.

If the advertisement data cannot be stored due to lack of the capacity of the advertisement storage unit 215 of the memory unit 211, the mobile terminal 105 can generate an M-Notifyresp.ind signal by inserting 'Deferred' 517 into the status field 511 included in the M-Notification.ind PDU in order to indicate that the capacity for storing the advertisement data is insufficient. The mobile terminal 105 transmits the generated M-Notifyresp.ind signal to the multimedia message server 101.

If an M-Notifyresp.ind signal, which is an advertisement notification response signal, is received from the mobile terminal 105, the multimedia message server 101 determines by analyzing the M-Notifyresp.ind signal which text string 'Status-value' 511 contains. If the Status-value 511 contains 'Retrieved', the multimedia message server 101 can determine that advertisement data processing has been successfully performed in the mobile terminal 105.

If the Status-value 511 contains 'Deferred', the multimedia message server 101 can determine that the capacity for storing the advertisement data is insufficient in the mobile terminal 105. The multimedia message server 101 can generate an M-Notifyresp.ind signal for requesting modification or deletion of advertisement data and transmit the generated M-Notifyresp.ind signal to the mobile terminal 105 so that the mobile terminal 105 can store advertisement data. If the Status-value 511 contains 'Rejected', the multimedia message server 101 can determine that the mobile terminal 105 is set not to allow advertisement reception.

If a current state of the mobile terminal 105 satisfies the pre-set silent advertisement output condition, the mobile terminal 105 storing advertisement data can sequentially or randomly detect advertisement data from the memory unit 211. The mobile terminal 105 can generate a popup window containing the detected advertisement data and output the generated popup window.

Figure 6:
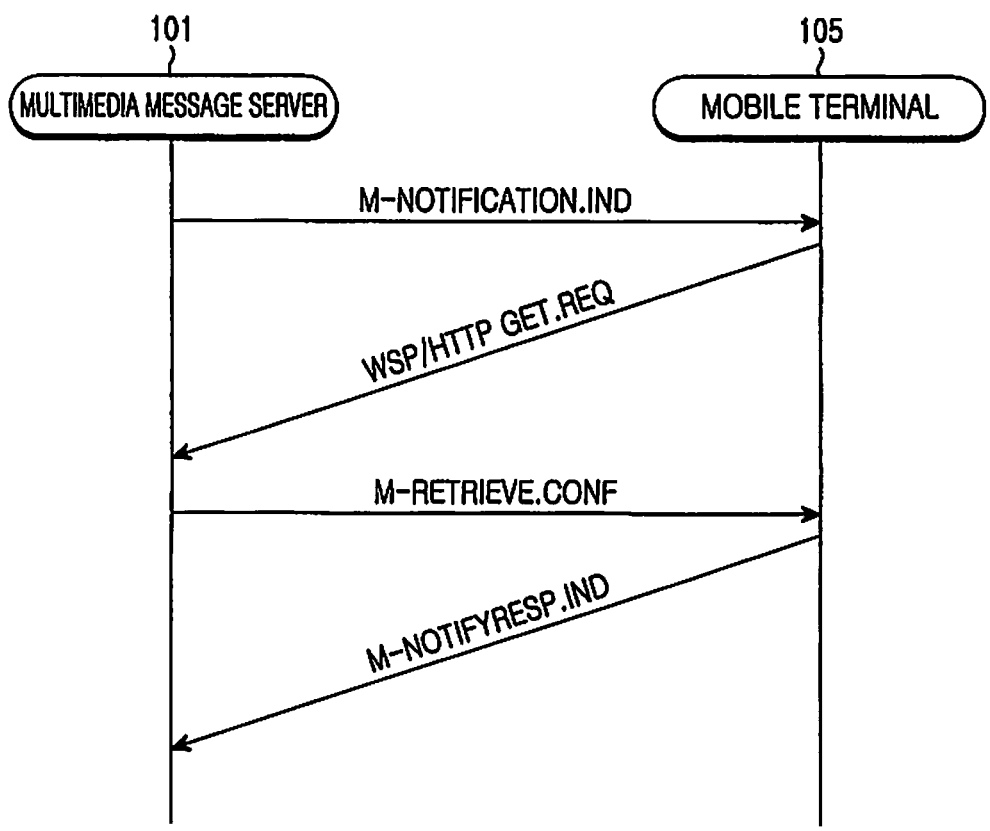
FIG. 6 is a signaling diagram of a process of transmitting advertisement data between a multimedia message server and a mobile terminal based on the MMS protocol of the OMA according to an exemplary embodiment of the present invention.

FIG. 6 is a signaling diagram of a process of transmitting advertisement data based on the MMS protocol of the OMA according to an exemplary embodiment of the present invention. The process of transmitting advertisement data in the multimedia message server 101 and receiving the advertisement data in the mobile terminal 105 will now be described with reference to FIGS. 1 to 6.

The multimedia message server 101 generates an M-Notification.ind signal by writing 'Silent_advertisement' 505 in the Message-Class-value of the message-class field 501 and writing 'ADD' in the Encoded-string-value 509 of the subject field 507. The multimedia message server 101 transmits the generated M-Notification.ind signal to the mobile terminal 105.

The mobile terminal 105 generates a WSP/HTTP GET.req signal, which is a signal for requesting transmission of advertisement data, and transmits the generated WSP/HTTP GET.req signal to the multimedia message server 101.

If the WSP/HTTP GET.req signal is received from the mobile terminal 105, the multimedia message server 101 generates an M-Retrive.conf message containing advertisement data and transmits the generated M-Retrive.conf message to the mobile terminal 105.

If the M-Retrive.conf message is received, the mobile terminal 105 detects the advertisement data by analyzing the M-Retrive.conf message and stores the detected advertisement data in the memory unit 211 of the mobile terminal 105. If the advertisement data is successfully stored, the mobile terminal 105 generates an M-Notifyresp.ind signal by inserting 'Retrieved' 513 into the status field 511 included in M-Notification.ind PDU. The mobile terminal 105 transmits the generated M-Notifyresp.ind signal to the multimedia message server 101.

Figure 7:
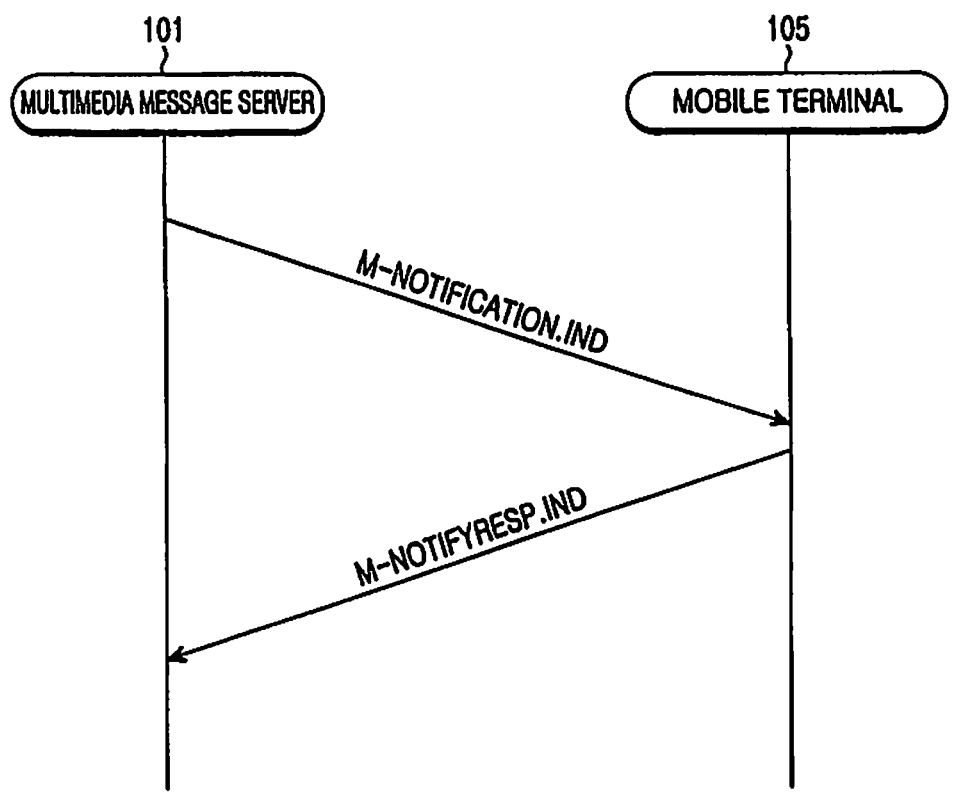
FIG. 7 is a signaling diagram of a process of rejecting advertisement data between a multimedia message server and a mobile terminal based on the MMS protocol of the OMA according to an exemplary embodiment of the present invention.

FIG. 7 is a signaling diagram of a process of rejecting advertisement data based on the MMS protocol of the OMA according to an exemplary embodiment of the present invention. The process of rejecting transmission of silent advertisement data in the mobile terminal 105 even if the multimedia message server 101 transmits an advertisement notification signal for indicating transmission of silent advertisement data will now be described with reference to FIGS. 1 to 7.

The multimedia message server 101 generates an M-Notification.ind signal by writing 'Silent_advertisement' 505 in the Message-Class-value of the message-class field 501 and writing 'ADD' in the Encoded-string-value 509 of the subject field 507. The multimedia message server 101 transmits the generated M-Notification.ind signal to the mobile terminal 105.

The mobile terminal 105 generates an M-Notifyresp.ind signal by inserting 'Rejected' 515 into the status field 511 in order to indicate that transmission of silent advertisement data is rejected and transmits the generated M-Notifyresp.ind signal to the multimedia message server 101.

Figure 8:
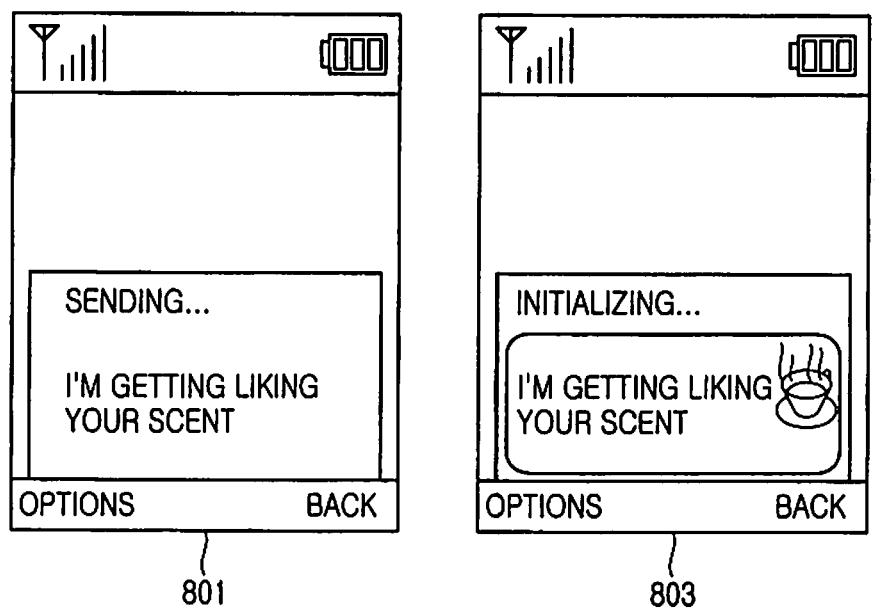
FIG. 8 illustrates advertisement screens displayed by a mobile terminal according to an exemplary embodiment of the present invention.

FIG. 8 illustrates screens displayed when the mobile terminal 105 satisfies the advertisement output condition according to an exemplary embodiment of the present invention. The screens displayed by the mobile terminal 105 when the advertisement output condition is satisfied will now be described with reference to FIGS. 1 to 8.

In order to simply describe the current embodiment, the advertisement output condition is set to output an advertisement during transmission of a short message or a multimedia message and to output an advertisement during initialization of an arbitrary program.

If transmission of a short message or a multimedia message is requested by the user, the mobile terminal 105 can output a screen 801 until the transmission ends, by detecting arbitrary advertisement data and generating a popup window associated with the detected advertisement data. The screen 801 is an illustration of a screen output when the advertisement data is an advertisement copy created with text. If a sound signal, such as music or voice, is contained in the advertisement data, when the screen 801 is output, the mobile terminal 105 can output the sound signal together with the screen 801.

If execution of an arbitrary program is requested, the mobile terminal 105 can output a screen 803 until initialization of the program ends, by detecting arbitrary advertisement data and generating a popup window associated with the detected advertisement data. The screen 803 is an illustration of a screen output when the advertisement data is an advertisement banner created with a still image.

Although it has been described in FIG. 8 that a popup window is used when advertisement data is output, the advertisement data can be output using another method. Further, the screen 801, which is a text screen, and the screen 803, which is a still image screen, have been illustrated as screens for outputting advertisement data. However, an advertisement screen containing a moving picture can be output, and an advertisement screen containing at least one of text, a still image, a moving picture, and music can be output.

Through the above-described procedures, a sponsor can transmit silent advertisement data to the mobile terminal 105 using a multimedia message. The mobile terminal 105 can receive and store arbitrary advertisement data, and if a current state of the mobile terminal 105 satisfies the silent advertisement output condition, the mobile terminal 105 can detect and output pre-stored advertisement data. Accordingly, the mobile terminal 105 can provide an advertisement so that the user does not have a desire to reject the advertisement.

As described above, according to the present invention, a communication provider operating a multimedia message server can transmit silent advertisement data to mobile terminals based on a request of a sponsor and modify silent advertisement data stored in the mobile terminals based on a request of the sponsor.

In addition, by outputting silent advertisement data according to a silent advertisement output condition, a mobile terminal can minimize inconvenience of a user viewing an advertisement, and a Public Relations (PR) effect of the advertisement can be maximized by outputting the silent advertisement data for a program loading time and a message transmission time and outputting the silent advertisement data even in popup windows for notifying the user of arbitrary information.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of providing a silent advertisement in a mobile terminal, the method comprising:

when an advertisement notification signal for addition is received from among advertisement notification signals used to add, delete, and modify the silent advertisement, transmitting a transmission signal for requesting a transmission of a multimedia message containing at least one silent advertisement displayed to a user;

when the multimedia message is received, detecting the silent advertisement by analyzing the multimedia message and storing the silent advertisement contained in the multimedia message without notifying the user of the reception based on the detection; and when a current operational state of the mobile terminal corresponds to a pre-set silent advertisement output condition, outputting the silent advertisement, wherein the pre-set silent advertisement output condition comprises a condition of outputting the silent advertisement in a popup window for outputting arbitrary information to the user.

2. The method of claim 1, further comprising if the advertisement notification signal for a deletion is received, the mobile terminal deleting corresponding silent advertisement from among pre-stored silent advertisement according to deletion information contained in the advertisement notification signal.

3. The method of claim 2, further comprising:

if the advertisement notification signal for a modification is received, the mobile terminal deleting corresponding silent advertisement from among the pre-stored silent advertisement according to modification information contained in the advertisement notification signal; and transmitting the transmission signal, receiving the multimedia message, and detecting and storing the silent advertisement contained in the multimedia message without notifying the user of the reception.

4. The method of claim 1, wherein the advertisement contains at least one of a still image, a moving picture, text, and music.

5. The method of claim 1, wherein the silent advertisement output condition comprises a condition of outputting the silent advertisement during transmission of an arbitrary message and a condition of outputting the silent advertisement during initialization of an arbitrary program.

6. The method of claim 5, wherein the silent advertisement output condition further comprises a condition of outputting a popup window for receiving arbitrary information from the user.

7. The method of claim 1, wherein the mobile terminal receives the multimedia data according to a Multimedia Messaging Service (MMS) protocol of the Open Mobile Alliance (OMA).

8. An apparatus for providing a silent advertisement in a mobile terminal, the apparatus comprising:

a display unit;

a sound processing unit;

a Radio Frequency (RF) module; and a controller for, when an advertisement notification signal for addition is received from among advertisement notification signals used to add, delete, and modify the silent advertisement, transmitting a transmission signal for requesting a transmission of a multimedia message containing at least one silent advertisement displayed to a user, when the multimedia message is received in response to the transmission signal, detecting the silent advertisement by analyzing the multimedia message and storing the silent advertisement contained in the multimedia message without notifying the user of the reception based on the detection, and when a current operational state of the mobile terminal corresponds to a pre-set silent advertisement output condition, outputting the silent advertisement, wherein the pre-set silent advertisement output condition comprises a condition of outputting the silent advertisement in a popup window for outputting arbitrary information to the user.

9. The apparatus of claim 8, wherein if the advertisement notification signal for a deletion is received, the controller deletes a corresponding silent advertisement from among pre-stored silent advertisement according to deletion information contained in the advertisement notification signal.

10. The apparatus of claim 9, wherein if the advertisement notification signal for a modification is received, the controller deletes a corresponding silent advertisement from among the pre-stored silent advertisement according to modification information contained in the advertisement notification signal, transmits the transmission signal, receives the multimedia message, and detects and stores the silent advertisement contained in the multimedia message without notifying the user of the reception.

11. The apparatus of claim 8, wherein the advertisement contains at least one of a still image, a moving picture, text, and music.

12. The apparatus of claim 8, wherein the silent advertisement output condition comprises a condition of outputting the silent advertisement during transmission of an arbitrary message and a condition of outputting the silent advertisement during initialization of an arbitrary program.

13. The apparatus of claim 12, wherein the silent advertisement output condition further comprises a condition of outputting a popup window for receiving arbitrary information from the user.

14. The apparatus of claim 8, wherein the mobile terminal receives the multimedia data according to a Multimedia Messaging Service (MMS) protocol of the Open Mobile Alliance (OMA).

* * * * *